United States Patent
Mitchell et al.

(10) Patent No.: US 11,468,904 B2
(45) Date of Patent: Oct. 11, 2022

(54) COMPUTER APPARATUS AND METHOD IMPLEMENTING SOUND DETECTION WITH AN IMAGE CAPTURE SYSTEM

(71) Applicant: Audio Analytic Ltd, Cambridgeshire (GB)

(72) Inventors: Christopher James Mitchell, Cambridgeshire (GB); Sacha Krstulovic, Cambridgeshire (GB); Neil Cooper, Cambridgeshire (GB); Julian Harris, Cambridgeshire (GB)

(73) Assignee: AUDIO ANALYTIC LTD, Cambridgeshire (GB)

( * ) Notice: Subject to any disclaimer, the term of this patent is extended or adjusted under 35 U.S.C. 154(b) by 287 days.

(21) Appl. No.: 16/718,847

(22) Filed: Dec. 18, 2019

(65) Prior Publication Data

US 2021/0193155 A1 Jun. 24, 2021

(51) Int. Cl.
*G10L 15/02* (2006.01)
*G10L 17/26* (2013.01)
*G06F 16/683* (2019.01)
*H04N 5/232* (2006.01)

(52) U.S. Cl.
CPC ............ *G10L 17/26* (2013.01); *G06F 16/683* (2019.01); *G10L 15/02* (2013.01); *H04N 5/23203* (2013.01); *H04N 5/23225* (2013.01)

(58) Field of Classification Search
CPC ... G10L 15/02; G06F 16/683; H04N 5/23203; H04N 5/23225
See application file for complete search history.

(56) References Cited

U.S. PATENT DOCUMENTS

| | | | | |
|---|---|---|---|---|
| 9,788,027 | B1* | 10/2017 | Vucurevich | H04H 60/83 |
| 9,807,384 | B1* | 10/2017 | Jokinen | G06F 3/0304 |
| 2010/0208902 | A1* | 8/2010 | Yoshizawa | G10L 21/0208 |
| | | | | 381/56 |
| 2013/0275873 | A1* | 10/2013 | Shaw | G01S 15/876 |
| | | | | 715/716 |

(Continued)

FOREIGN PATENT DOCUMENTS

| | | | | |
|---|---|---|---|---|
| CN | 109600681 | A * | 4/2019 | G06F 40/30 |
| CN | 211788155 | U * | 10/2020 | G06F 40/30 |

(Continued)

*Primary Examiner* — Daniel C Washburn
*Assistant Examiner* — Oluwadamilola M Ogunbiyi
(74) *Attorney, Agent, or Firm* — Tarolli, Sundheim, Covell & Tummino LLP

(57) ABSTRACT

A computing device comprising a processor, the processor configured to: receive, from an image capture system, an image captured in an environment and image metadata associated with the image, the image metadata comprising an image capture time; receive a sound recognition message from a sound recognition module, the sound recognition message comprising (i) a sound recognition identifier indicating a target sound or scene that has been recognised based on captured audio data captured in the environment, and (ii) time information associated with the sound recognition identifier; detect that the target sound or scene occurred at a time that the image was captured based on the image metadata and the time information in the sound recognition message; and output a camera control command to said image capture system based on said detection.

17 Claims, 4 Drawing Sheets

(56) References Cited

U.S. PATENT DOCUMENTS

| | | | |
|---|---|---|---|
| 2013/0321645 A1* | 12/2013 | Cashin | H04N 17/00 348/E17.005 |
| 2014/0172557 A1* | 6/2014 | Eden | G06F 3/042 705/14.49 |
| 2015/0106958 A1* | 4/2015 | Holman | G06F 21/64 726/32 |
| 2015/0312528 A1* | 10/2015 | Vucurevich | G06Q 30/02 386/223 |
| 2016/0005435 A1* | 1/2016 | Campbell | H04N 5/23238 386/240 |
| 2016/0042767 A1* | 2/2016 | Araya | G11B 27/34 386/201 |
| 2016/0155475 A1* | 6/2016 | Hamer | H04N 21/8456 386/224 |
| 2017/0243520 A1* | 8/2017 | Teshima | H04R 3/00 |
| 2017/0243617 A1* | 8/2017 | Lee | G06V 20/46 |
| 2019/0373210 A1* | 12/2019 | Nguyen | H04N 21/8547 |
| 2020/0020328 A1* | 1/2020 | Gordon | G08B 13/19647 |
| 2020/0204856 A1* | 6/2020 | Dalbec | H04N 21/8547 |
| 2020/0279390 A1* | 9/2020 | Koskan | G08B 13/19647 |
| 2020/0342652 A1* | 10/2020 | Rowell | G06T 15/04 |
| 2020/0389755 A1* | 12/2020 | Laaksonen | H04S 7/304 |
| 2021/0073898 A1* | 3/2021 | Saiz Serrano | G06Q 30/0643 |
| 2021/0104242 A1* | 4/2021 | Hashimoto | G06F 3/167 |
| 2021/0104255 A1* | 4/2021 | Mitchell | G10L 25/51 |
| 2021/0134298 A1* | 5/2021 | Cheng | H04N 21/47202 |
| 2021/0183265 A1* | 6/2021 | Watkins | H04W 76/10 |
| 2021/0375111 A1* | 12/2021 | Huang | G08B 13/1672 |

FOREIGN PATENT DOCUMENTS

| | | | | |
|---|---|---|---|---|
| DE | 102018110338 A1 | * | 11/2018 | G06T 15/205 |
| EP | 2853962 A1 | * | 4/2015 | G05B 15/02 |
| EP | 3828888 A1 | * | 6/2021 | G08B 1/08 |
| KR | 20150099774 A | * | 9/2015 | |
| WO | WO-2016007988 A1 | * | 1/2016 | H04N 7/181 |
| WO | WO-2021065398 A1 | * | 4/2021 | G05B 15/02 |

\* cited by examiner

COMPUTER APPARATUS AND METHOD IMPLEMENTING SOUND DETECTION WITH AN IMAGE CAPTURE SYSTEM

FIELD

The present disclosure generally relates to monitoring sound events in a computer monitored environment, and triggering computer implemented actions in response to such sound events.

BACKGROUND

Background information on sound recognition systems and methods can be found in the applicant's PCT application WO2010/070314, which is hereby incorporated by reference in its entirety.

The present applicant has recognised the potential for new applications of sound recognition systems.

SUMMARY

The inventors have recognised that it would be advantageous to add sound event information to pictures taken from a camera, and to control the camera into performing further processing triggered by a synchronous occurrence of image and audio.

According to one aspect of the invention there is provided a computing device comprising a processor, the processor configured to: receive, from an image capture system, an image captured in an environment and image metadata associated with the image, the image metadata comprising an image capture time; receive a sound recognition message from a sound recognition module, the sound recognition message comprising (i) a sound recognition identifier indicating a target sound or scene that has been recognised based on captured audio data captured in the environment, and (ii) time information associated with the sound recognition identifier; detect that the target sound or scene occurred at a time that the image was captured based on the image metadata and the time information in the sound recognition message; and output a camera control command to the image capture system based on the detection.

Generally speaking, embodiment of the invention provide numerous advantages such as (a) improved accuracy in controlling the processing in a camera, (b) enhancing image consumption experience, and (c) providing intelligence at the edge (i.e., providing richer data from the point of capture) to alleviate the cloud and facilitate multimedia information retrieval.

For example, embodiments of the present invention provide for intelligent camera control. This provides improved accuracy of controlling a camera and improved reliability by automating camera operations based on the occurrence of sounds.

Embodiments of the present invention provide for improved image consumption experience for example by including sounds in images to enhance the image consumption experience for a user. For example, embodiments of the present invention provide for the recognised sound(s) to be bracketed and isolated from the rest of the audio, rather capturing all of the audio as it happens during the shot. As such, the experience is improved because only the salient sound is included (e.g., laughter sound only, without the silence before and after that provides for better synchronisation between image and sound). For example, adding "just the laugh" to a picture of a child, or captured and isolated water sounds to a picture of a boat improves the experience of watching pictures.

Furthermore, embodiments of the present invention provide for more accurately enhancement images. For example, embodiments of the present invention confirm the application of "Outdoors image filter" if the detected sounds were indicators of an outdoors scene (e.g. wind, cars passing by etc.)

Embodiments of the present invention further provide for improved picture quality by: selecting the best picture based on sound co-occurrence criteria; and/or improving the selection of filters or image processing methods on the basis of sound co-occurrence criteria (e.g., confirming outdoors). For example, given a series of pictures taken as a burst, the best ones may be occurring jointly or soon after certain sounds, e.g., pictures co-occurring with the sound of laughter may correspond to the best facial expressions, or a better image filter may be chosen on the basis of extra sound scene information (indoors, outdoors, seaside, forest . . . ). Embodiments of the present invention provide for a process to apply a preferred image filter on the basis of a sound occurring alongside an image.

Further advantageously, embodiments of the present invention can inform a user about sound co-occurrence to help the user interact with their camera. For example, embodiments of the present invention can inform a user that a "cute laugh has happened, I would suggest keeping this picture" or "wind noise happened in this video". This provides for enhanced user experience and further results in improved image quality. Additionally, this relieves cognitive load on the user (i.e. the photographer) as it may be tricky for a user to listen while visually focusing at the same time.

Further advantageously, embodiments of the present invention provide for informing a user of audio processing on the captured sound. For example, embodiments of the present invention can inform a user that laugh sounds may sound better with added reverb; or to remove wind noise or traffic noise from outdoors video.

Generally speaking, embodiments of the present invention implements "intelligence at the edge", i.e., enriching data with sound-related tags at the point of capture rather than relying on post-processing into the cloud to seam various data modalities back together. Advantageously, embodiments of the present invention enrich data captured at the edge, rather than relying on the cloud to seam data sources back together a posteriori. Advantageously, embodiments of the present invention add metadata to an image in a file system before storage, for example, in the cloud. This therefore results in uploading improved (richer) data (i.e. images and/or audio) to the cloud but where the computing power necessary to enrich the data is spent at the edge where the data is captured, thus alleviating computational load on the cloud and facilitating multimedia information retrieval further down the line. Further advantageously, embodiments of the present invention provide for sound information to enrich visual information by inclusion into the metadata directly at the edge where the data is captured. This alleviates the computational load on the cloud, which may provide environmental energy consumption benefits. The enhanced metadata provided for by embodiments of the invention advantageously allow for more complex and more accurate retrieval operations. For example, such enhanced image metadata may disambiguate "dog" and "hot dog" picture tags because the dog picture's metadata contains the indication of a bark sound, without requiring application of computational image recognition.

Generally speaking, therefore, embodiments of the present invention combine a sound recognition system and a camera system, where sound detection generates information which advantageously enriches the picture viewing experience and helps controlling the camera.

A target sound and/or scene may be a sound resulting from an event and/or scene and/or action. Examples of a target sound may be a baby crying, a gun shooting, a dog barking. A further example of a target sound is recognising a presence of a person talking, in other words a method for recognising a target sound and/or scene may include a method that comprises determining that a person is speaking (or other details such as when a person has started and stopped speaking, or determining that more than one person is speaking). A method for recognising a target sound and/or scene may not comprise recognising and, for example transcribing, exact words of speech, such methods fall within speech recognition.

The sound recognition message may additionally comprise sound recognition information comprising at least one of: the captured audio data; an instruction to obtain the captured audio data; and pre-stored audio data associated with the sound recognition identifier.

The processor may be further configured to add the sound recognition information to the image metadata.

The sound recognition information may comprise a sound location, and the image metadata comprises an image location; and the processor may be further configured to determine that the sound location and the image location are in the environment, wherein the output of the camera control command to the image capture system may be further based on the determination.

The image metadata may comprise an image capture date and the sound recognition message may comprise date information associated with the sound recognition identifier; and the processor may be configured to detect that the target sound or scene occurred at a date that the image was captured based on the image metadata and the date information in the sound recognition message, wherein the output of the camera control command may be further based on the detection.

The camera control command may be output to an image processing module of the image capture system and the camera control command may instruct the image processing module to process the image based on the sound recognition identifier.

The camera control command may instruct the image processing module of the image capture system to process the image by: instructing the image processing module to store the image in a memory of the image capture system; or instructing the image processing module to delete the image from the memory of the image capture system; or instructing the image processing module to perform an editing operation on the image to generate an edited image and storing the edited image in the memory of the image capture system.

The processor may be configured to: receive, from the image capture system, at least one further image and associated further image metadata comprising (i) a further sound recognition identifier; and the camera control command may comprise an instruction to instruct the image processing module of the image capture system to: select a preferred image from the image and the at least one additional image based on the sound recognition identifier and the further sound recognition identifier; and store the preferred image. The preferred image may be stored locally on an image capture device of the image capture system or may be stored at a cloud storage (i.e. remote storage) of the image capture system.

The camera control command may be output to a user interface control module of the image capture system and the camera control command may instruct the user interface control module to control a user interface of the image capture system based on the sound recognition identifier.

The camera control command may instruct the user interface control module to control the user interface to perform one or more of: display a description of the image on a display screen of the user interface; display an alert on the display screen of the user interface; output a description of the image from a speaker of the user interface; output, from the speaker of the user interface, a description of a sound occurring at the time that the image was captured; output, from the speaker of the user interface, a combined description of the sound and the image; and output an alert from the speaker of the user interface.

The camera control command may be output to an audio processing module of the image capture system and the camera control command may instruct the audio processing module to process the sound recognition information based on the sound recognition identifier.

The camera control command may output to the image capture system, and the camera control command may instruct the image capture system to capture one or more further images.

The image capture system may comprise one or more of: the computing device; a user interface; a camera image capture device; a display screen; an audio correction module; a digital storage; an encoding module, and an image processing module.

The computing device may be one of: a smartphone, a camera, a wearable device, a headphone, an earphone, a smart speaker comprising a camera, a smart home device, a digital photo frame, an in-vehicle device, a digital personal assistant, a personal computer, a tablet computer. A wearable device is an electronic device configured to be worn by a user. A smart home device may be for example a smart lighting device, a smart heating control system, or a smart security device. A digital personal assistant may be situated on a device comprising a speaker and a microphone configured to receive commands from a user.

The target sound may be a non-verbal sound. Embodiments described herein relate to providing improved detection of activity by combining detection of a user's activity based on motion sensor signals with the recognition of non-verbal sounds (i.e. a non-speech sound event). The non-verbal sound may be any non-speech sound that may be generated in an environment of a user for example a breaking glass sound, smoke alarm sound, baby cry sound etc. The non-verbal sound may be a sound produced by a human (e.g. paralinguistic speech such as laughter or coughing) or an animal. The non-verbal sound may be a vocal sound such as onomatopoeia (for example the imitation of animal sounds). This is in contrast to known voice assistant devices that typically respond to the detection of a human speaking a command word.

According to another aspect of the present invention, a computer implemented method, the method comprising: receiving, from an image capture system, an image captured in an environment and image metadata associated with the image, the image metadata comprising an image capture time; receiving a sound recognition message from a sound recognition module, the sound recognition message comprising (i) a sound recognition identifier indicating a target sound or scene that has been recognised based on captured audio data captured in the environment, and (ii) time information associated with the sound recognition identifier; detecting that the target sound or scene occurred at a time that the image was captured based on the image metadata and the time information in the sound recognition message; and outputting a camera control command to the image capture system based on the detection.

In a related aspect there is provided a non-transitory data carrier carrying processor control code which when running on a processor of a device causes the device to operate as described herein.

It will be appreciated that the functionality of the devices we describe may be divided across several modules and/or partially or wholly implemented in the cloud. Alternatively, the functionality may be provided in a single module or a processor. The or each processor may be implemented in any known suitable hardware such as a microprocessor, a Digital Signal Processing (DSP) chip, an Application Specific Integrated Circuit (ASIC), Field Programmable Gate Arrays (FPGAs), a Graphical Processing Unit (GPU), a Tensor Processing Unit (TPU), and so forth. The or each processor may include one or more processing cores with each core configured to perform independently. The or each processor may have connectivity to a bus to execute instructions and process information stored in, for example, a memory.

The invention further provides processor control code to implement the above-described systems and methods, for example on a general purpose computer system, a digital signal processor (DSP) or a specially designed math acceleration unit such as a Graphical Processing Unit (GPU) or a Tensor Processing Unit (TPU). The invention also provides a carrier carrying processor control code to, when running, implement any of the above methods, in particular on a non-transitory data carrier—such as a disk, microprocessor, CD- or DVD-ROM, programmed memory such as read-only memory (Firmware), or on a data carrier such as an optical or electrical signal carrier. The code may be provided on a carrier such as a disk, a microprocessor, CD- or DVD-ROM, programmed memory such as non-volatile memory (e.g. Flash) or read-only memory (Firmware). Code (and/or data) to implement embodiments of the invention may comprise source, object or executable code in a conventional programming language (interpreted or compiled) such as C, or assembly code, code for setting up or controlling an ASIC (Application Specific Integrated Circuit), FPGA (Field Programmable Gate Array), GPU (Graphical Processing Unit), TPU (Tensor Processing Unit) or NPU (Neural Processing Unit), or code for a hardware description language such as Verilog™ or VHDL (Very high speed integrated circuit Hardware Description Language). As the skilled person will appreciate such code and/or data may be distributed between a plurality of coupled components in communication with one another. The invention may comprise a controller which includes a microprocessor, working memory and program memory coupled to one or more of the components of the system. The invention may comprise performing a DNN operation on a GPU and/or an AI accelerator microprocessor, and performing other operations on a further processor.

These and other aspects will be apparent from the embodiments described in the following. The scope of the present disclosure is not intended to be limited by this summary nor to implementations that necessarily solve any or all of the disadvantages noted.

BRIEF DESCRIPTION OF THE DRAWINGS

For a better understanding of the present disclosure and to show how embodiments may be put into effect, reference is made to the accompanying drawings in which.

DETAILED DECRIPTION

Figure 1:
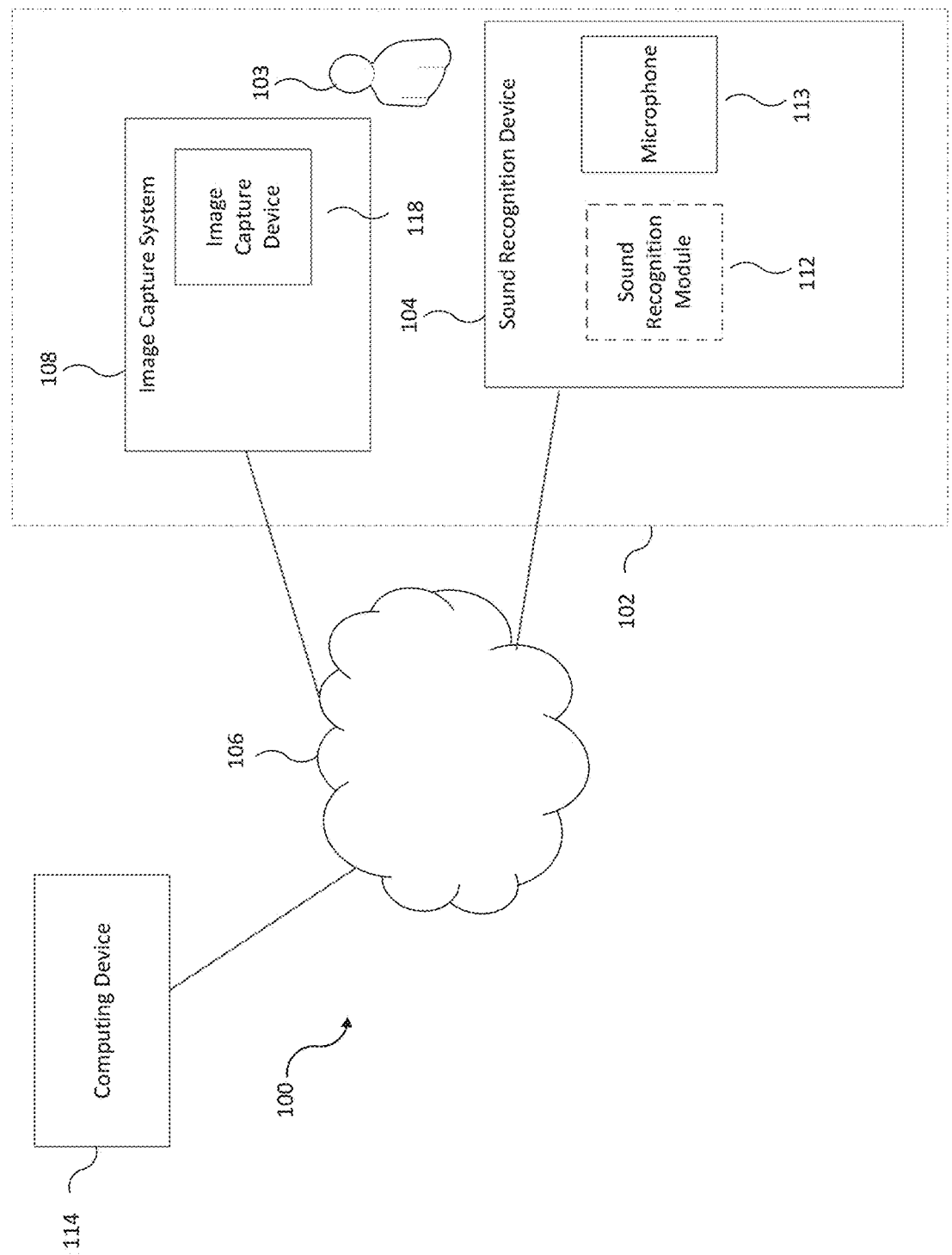
FIG. 1 shows illustrates an example system according to an embodiment of the present disclosure.

FIG. 1 shows a block diagram of a system 100 comprising example devices. The system 100 comprises devices connected via a network 106. The system 100 comprises a sound recognition device 104, an image capture system 108, and a camera control computing device 114. The sound recognition device 104, image capture system 108, and camera control computing device 114 may be connected to one another wirelessly or by a wired connection, for example by the network 106. This is only an example and the functionality of one or more of the sound recognition device 104, the image capture system 108 and the camera control computing device 114 may be part of a single device. That is, in one example the functionality of all of the sound recognition device 104, the image capture system 108 and the camera control computing device 114 are provided on a single computing device. In particular, in each of the embodiments described below, each of the processing stages may be implemented by way of portions of code executable on one or more processor of a single computing device.

FIG. 1 shows an example embodiment where the image capture system 108 comprises an image capture device 118. The image capture system 108 may further comprise one or more of an image processing module, a user interface, an audio processing module, a user interface; a camera image capture device; a display screen; an audio correction module; a digital storage; and an encoding module.

Some or all of the image capture system may be positioned in an environment 102. The sound recognition device 104 is also positioned in the environment 102. The environment 102 may further comprise a user 103 of the image capture system 108.

The sound recognition device 104 comprises a microphone 113 and a sound recognition module 112. In other embodiments, the sound recognition module may be positioned elsewhere in the system 100.

In embodiments, the microphone 113 and the sound recognition module 112 may be situated on different devices. For example, the sound recognition module 112 may be situated on the camera control computing device 114 or part of the image capture system 110. However, even in these embodiments, the microphone 113 is situated in the environment 102. This is because the microphone 113 is configured to capture a sound in the environment 102.

The sound recognition device 104 and the some or all components of the image capture system 108 may be part of a single device (for example a smartphone, a wearable device, a hearable device, a vehicle, an industrial monitoring device). In other words, there may be a single device (e.g. a smartphone, a wearable device, a hearable device, an vehicle, an industrial monitoring device) comprising the image capture system 108 and the microphone 113, and further optionally comprising the sound recognition module 112, and further optionally this single device may perform the functionality of the camera control computing device 114.

As explained in further detail below, the camera control computing device 114 is configured to receive information from the sound recognition device 104 and the image capture system 108. The camera control computing device 114 is configured to generate a camera control command to the image capture system 108.

Figure 2:
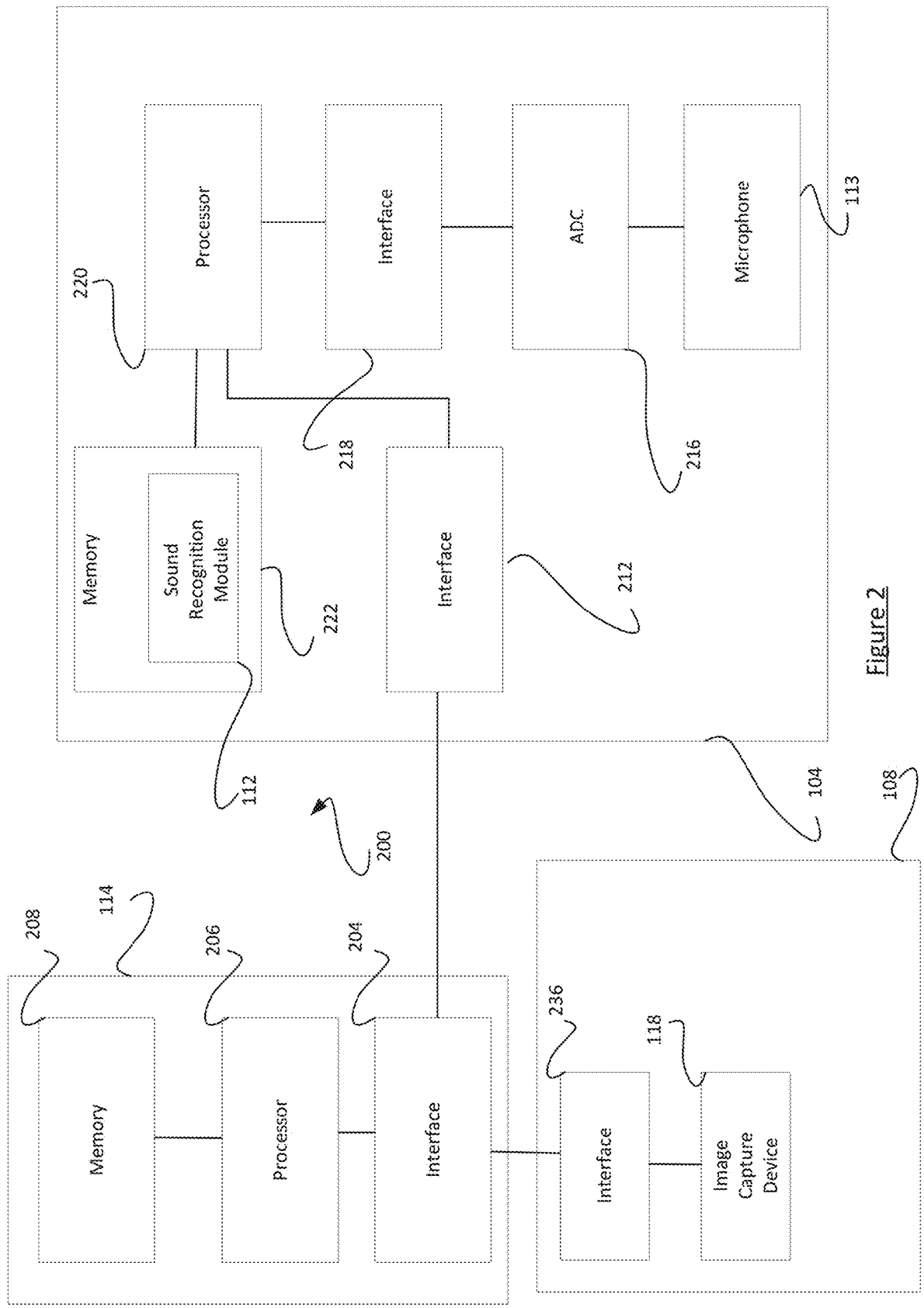
FIG. 2 shows a block diagram of example devices according to an embodiment of the present disclosure.

FIG. 2 shows a block diagram of a system 200 comprising the camera control computing device 114 in connection with the sound recognition device 104 and the image capture system 108.

FIG. 2 shows the camera control computing device 114 comprising a memory 208, a processor 206 and an interface 204. The interface is configured to communicate wirelessly or via wired connection with an interface 212 of the sound recognition device 104 and an interface 236 of the image capture system.

Figure 3:
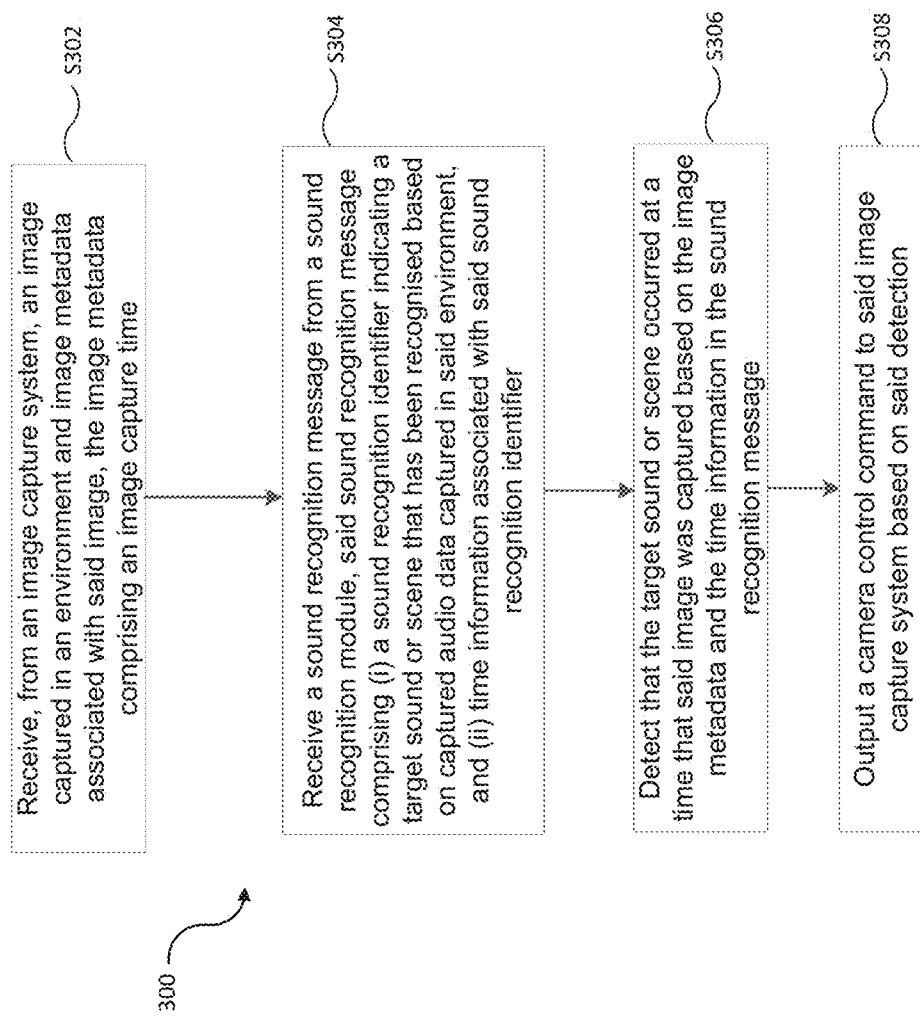
FIG. 3 is a flow chart illustrating a process according to an embodiment of the present disclosure.

The processor 206 of the camera control computing device 114 is configured to perform the method illustrated in FIG. 3. As part of this method, the processor 205 of the camera control computing device 114 is configured to receive a sound recognition message from the sound recognition module 112, the sound recognition message comprising (i) a sound recognition identifier indicating a target sound or scene that has been recognised based on captured audio data captured in the environment 102, and (ii) time information associated with the sound recognition identifier relating to one or more non-verbal sounds captured by the microphone 113.

FIG. 2 further shows the sound recognition device 104. The sound recognition device 104 may be any type of electronic device. The sound recognition device 104 may be a consumer electronic device. For example a consumer electronic device may be, a smartphone, a camera, a wearable device, a headphone, an earphone, a smart speaker comprising a camera, a smart home device, a digital photo frame, a car, a digital personal assistant, a personal computer, a tablet computer. The sound recognition device 104 comprises a memory 222, a processor 220, a microphone 113, an analogue to digital converter (ADC) 216, an interface 212 and an interface 218. The processor 220 is in connection to: the memory 222; the microphone 113; the analogue to digital converter (ADC) 216; interface 218; and the interface 212. The processor 220 is configured to process sound captured by the microphone 113. The processor 220 may comprise one or more of a CPU module and a DSP module. The memory 222 is configured to store computer code that when executed by the processor 220, causes the processor to process the captured sound to generate the sound recognition message. In embodiments, the memory 222 is configured to store computer code that when executed by the processor 220, causes the processor 220 to process the captured sound to recognise a non-verbal sound event and/or scene, this is displayed by the sound recognition module 112 stored in the memory 222.

The microphone 113 is configured to convert a sound into an audio signal. The audio signal may be an analogue signal, in which case the microphone 113 is coupled to the ADC 216 via the interface 218. The ADC 216 is configured to convert the analogue audio signal into a digital signal. The digital audio signal can then be processed by the processor 220. In embodiments, a microphone array (not shown) may be used in place of the microphone 213.

Although the ADC 216 and the microphone 113 are shown as part of the sound recognition device 104, one or more of the ADC 216 and the microphone 113 may be located remotely to the sound recognition device 104. If one or more of the ADC 216 and the microphone 113 are located remotely to the sound recognition device 104, the processor 220 is configured to communicate with the ADC 216 and/or the microphone 113 via the interface 218 and optionally further via the interface 212.

The processor 220 may further be configured to communicate with a remote computing system (not shown). The remote computing system is configured to generate the sound recognition message, therefore the processing steps required to generate the sound recognition message may be spread between the processor 220 and a processor of the remote computing system.

The interface 204 of the camera control computing device 114 is further configured to communicate with the image capture system 108 via the interface 236 of the image capture system 108. The processor 206 of the camera control computing device 114 is configured to receive, via the interface 204, an image captured in the environment 102 and image metadata associated with the image, the image metadata comprising an image capture time.

The sound recognition module 112, image capture system 230 microphone 113, and camera control computing device 114 may form a single device, such as a consumer electronic device.

In an alternate embodiment, sound recognition module 112, image capture system 230 microphone 113, and computing device 114 may all be on separate devices.

In a further embodiment, the sound recognition module 112, and camera control computing device 114 form a single device, for example a cloud computing device, and the image capture system 108 and microphone 113 are positioned on separate device, for example a smartphone or a remote sensing devices.

FIG. 3 is a flow chart illustrating a process performed by a processor 206 of the camera control computing device 114 according to an embodiment of the invention.

At step S302 the processor 206 is configured to receive, from the image capture system 108, an image captured in an environment 102 and image metadata associated with the image, the image metadata comprising an image capture time.

At step S304 the processor 206 is configured receive a sound recognition message from a sound recognition module 112, the sound recognition message comprising (i) a sound recognition identifier indicating a target sound or scene that has been recognised based on captured audio data captured in the environment 102, and (ii) time information associated with the sound recognition identifier.

At step S306 the processor 206 is configured to detect that the target sound or scene occurred at a time that the image was captured based on the image metadata and the time information in the sound recognition message.

At step S308 the processor 206 is configured to output a camera control command to the image capture system 108 based on the detection.

Figure 4:
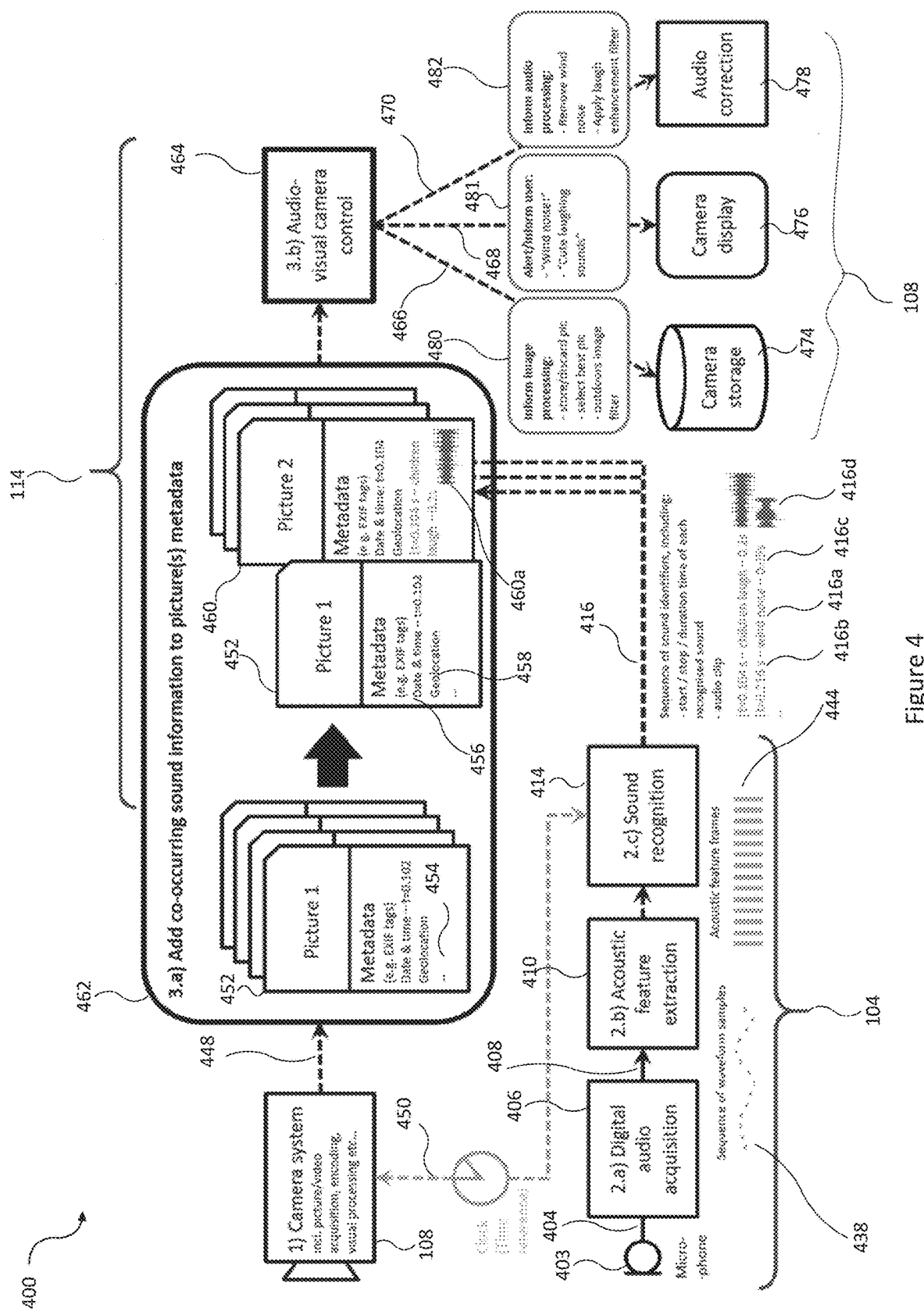
FIG. 4 is a schematic diagram illustrating an implementation of an embodiment of the present disclosure.

FIG. 4 is a schematic diagram illustrating an implementation of an embodiment of the present disclosure.

Sound Recognition

One example of a sound recognition systems and methods can be found in the applicant's PCT application WO2010/070314. This may be implemented by the sound recognition module 112. We will describe further examples of sound recognition below.

One or more non-verbal sounds are acquired by a microphone 403, for example microphone 113 of FIG. 1. The audio sample 215 is then sent (at transmission 404) to an analogue to digital converter stage 406 and converted from analogue samples to digital samples by, for example by the analogue to digital converter (ADC) 216 in FIG. 2. With reference to FIG. 2, the processor 220 is configured to receive the digital samples from the ADC 216 via the interface 218, for example a serial interface such as 120. The sampling frequency may be 16 kHz, this means that 16,000 audio samples are taken per second.

The analogue to digital converter 406 outputs a sequence of digital audio samples 438. The digital audio samples may be grouped into a series of 32 ms long frames with 16 ms long hop size. If the sampling frequency is 16 Khz, then this is equivalent to the digital audio sample being grouped into a series of frames that comprise 512 audio samples with a 256 audio samples-long hop size.

Once the digital audio samples have been acquired, feature extraction is performed on the frames of the digital audio samples 438, by the acoustic feature extraction stage 410. The acoustic feature extraction stage 410 outputs a sequence of acoustic feature frames 444. The acoustic feature extraction stage 410 comprises transforming the sequence of waveform samples 438 into a series of multi-dimensional feature vectors 444 (i.e. frames), for example emitted every 16 ms. The acoustic feature extraction stage 410 may be implemented in a variety of ways.

One implementation of acoustic feature extraction stage 410 is to perform one or more signal processing algorithms on the sequence of waveform samples 438. An example of a signal processing algorithm is an algorithm that processes a power spectrum of the frame, for example obtained using the fast Fourier transform (FFT), to extract a spectral flatness value for the frame. A further example is a signal processing algorithm that extracts harmonics and their relative amplitudes from the frame.

An additional or alternative implementation of the acoustic feature extraction stage 410 is to use a Deep Neural Network (DNN) to extract a number of acoustic features for a frame. A DNN can be configured to extract audio feature vectors of any dimension. A bottleneck DNN embedding or any other appropriate DNN embedding may be used to extract acoustic features. Here a neural network bottleneck may refer to a neural network which has a bottleneck layer between an input layer and an output layer of the neural network, where a number of units in a bottleneck layer is less than that of the input layer and less than that of the output layer, so that the bottleneck layer is forced to construct a generalised representation of the acoustic input.

Feature vector stacking is optionally performed by the acoustic feature extraction stage 410. The feature vector stacking step comprises concatenating the acoustic feature vectors 217 into larger acoustic feature vectors 219. The concatenation comprises grouping adjacent feature vectors into one longer (i.e. a higher dimensional) feature vector.

For example, if an acoustic feature vector comprises 32 features, the feature vector stacking step may produce a 352 dimension stacked feature vector by concatenating an acoustic feature vector with 5 acoustic feature vectors before and after the considered acoustic feature vector (352 dimensions=32 dimensions×11 frames, where 11 frames=5 preceding acoustic feature vector+1 central acoustic feature vector+5 following acoustic feature vectors).

An alternative example of the feature vector stacking step would be to stack 15 acoustic feature vectors before and after a central acoustic feature vector, where an original acoustic feature vector having 43 features would produce a stacked acoustic feature vector with 1333 dimensions (1333 d=43 d×31 acoustic feature vectors, where 31 acoustic feature vectors=15 before+1 central+15 after).

The acoustic feature frames 444 are then processed to recognise a sound and/or scene at sound recognition stage 414, this processing can be performed in a number of ways, an embodiment will be described below. It will be appreciated that when feature vector stacking is performed, the acoustic feature extraction stage 410 outputs stacked acoustic feature frames.

A first step of recognising a sound and/or scene performed at sound recognition stage 414 comprises an acoustic modelling step classifying the acoustic features to classify the frame by determining, for each of a set of sound classes, a score that the frame represents the sound. In one example, the acoustic modelling step comprises using a deep neural network (DNN) trained to classify each incoming acoustic feature vector into a sound class (e.g. glass break, dog bark, baby cry etc.). Therefore, the input of the DNN is an acoustic feature vector and the output is a score for each sound class. The scores for each sound class for a frame may collectively be referred to as a frame score vector. For example, the DNN used in the sound recognition stage 414 is configured to output a score for each sound class modelled by the system every 16 ms.

An example DNN used in the sound recognition stage 414 is a feed-forward fully connected DNN having 992 inputs (a concatenated feature vector comprising 15 acoustic vectors before and 15 acoustic vectors after a central acoustic vector=31 frames×32 dimensions in total). The example DNN has 3 hidden layers with 128 units per layer and RELU activations.

Alternatively, a convolutional neural network (CNN), a recurrent neural network (RNN) and/or some other form of deep neural network architecture or combination thereof could be used.

A score warping step is an optional step that follows. In this step, the scores are reweighted according to probabilities learned from application-related data. In other words, the scores output by the DNN are adjusted based on some form of knowledge other than the audio data acquired from the microphone 403. The knowledge may be referred to as external information. As examples, the score warping may comprise the following method: using prior probabilities of sound event and/or scene occurrence for a given application to reweight one or more scores. For example, for sound recognition in busy homes, the scores for any sound class related to speech events and/or scenes would be weighted up. In contrast, for sound recognition in unoccupied homes, the scores for any sound class related to speech events and/or scenes would be weighted down.

Following the described acoustic modelling step classifying the acoustic features, long-term acoustic analysis is performed. The long-term acoustic analysis comprises processing the sound class scores for multiple frames of the sequence of frames to generate, for each frame, a sound class decision for each frame. The long-term acoustic analysis outputs frame-level classification decisions after integrating longer term temporal information, typically spanning one or several seconds, into the frame-level scoring. As an example, if there are four sound classes: A, B, C and D, the long-term acoustic analysis performed will comprise receiving a sequence of vectors. Each vector would have four dimensions, where each dimension represents a (optionally reweighted) score for a class. The long-term acoustic analysis performed comprises processing the multiple vectors that represent a long-term window, typically 1.6 second/100 score values long context window. The long-term acoustic analysis will then comprise outputting a series of classification decisions for each frame (i.e. the output will be A, B, C or D for each frame, rather than 4 scores for each frame). The long-term acoustic analysis therefore uses information derived from frames across a long-term window.

The long-term acoustic analysis can be used in conjunction with external duration or co-occurrence models. For example:

Transition matrices can be used to impart long-term information and can be trained independently of Viterbi. Transition matrices are an example of a co-occurrence model and also implicitly a duration model. Co-occurrence models comprise information representing a relation or an order of events and/or scenes.

An explicit model of duration probabilities can be trained from ground truth labels (i.e. known data), for example fitting a Gaussian probability density function on the durations of one or several baby cries as labelled by human listeners. In this example, a baby cry may last between 0.1 s and 2.5 s and be 1.3 s long on average. More generally, the statistics of duration can be learned from external data. For example, from label durations or from a specific study on a duration of a specific sound event and/or scene.

Many types of model can be used as long as they are able to generate some sort of class-dependent duration or co-occurrence score/weight (e.g., graphs, decision trees etc.) which can, for example, be used to rescore a Viterbi path(s), or alternatively, be combined with the sound class scores by some method other than the Viterbi algorithm across the long term, for example across a sequence of score frames spanning 1.6 s.

Examples of the long-term acoustic analysis are given below, where the long-term acoustic analysis may thus apply a temporal structure constraint.

Score smoothing and thresholding

Viterbi optimal path search a recurrent DNN trained to integrate the frame decisions across a long-term window.

In more detail:

a) Score Smoothing and Thresholding Across Long Term Window

Median filtering or some other form of long-term low-pass filtering (for example a moving average filter) may be applied to the score values spanned by the long-term window. The smoothed scores may then be thresholded to turn the scores into class decisions, e.g., when a baby cry score is above the threshold then the decision for that frame is baby cry, otherwise the decision is world ("not a baby"). There is one threshold per class/per score.

b) Viterbi Optimal Path Search Across a Long Term Window

Examples of using the Viterbi algorithm to perform the long-term acoustic analysis comprises:

A state-space definition: there are S states where each state (s_i) is a sound class, for example: s_0==world; s_1==baby_cry; s_2==glass_break; etc. In one configuration there are 6 states however, in general there are as many states as there are classes to be recognised plus an extra state representing all other sounds (labelled as a 'world' class (i.e. a non-target sound class) in the above).

An array of initial probabilities: this is a S-sized array, where the i-th element is the probability that the decoded sequence starts with state i. In an example, these probabilities are all equal (for example, all equal to 1/S).

A transition matrix A: this is a S×S matrix where the element (i, j) is the probability of moving from state i to state j. In an example configuration, this matrix is used to block transitions between target classes, for example, the probabilities of the row 0 (world class) are all greater than zero, which means a state can move from world to all other target classes. But, in row 1 (baby cry) only columns 0 and 1 are non-zero, which means that from baby cry the state can either stay in the baby cry state or move to the world state. Corresponding rules apply for the other rows.

An emission matrix: this is a N×S matrix where the element (i, j) is the score (given by the acoustic model, after warping) of observing class j at the time frame i. In an example, N is equal to 100. In this example, the time window is 100 frames long (i.e. 1.6 seconds) and it moves with steps of 100 frames, so there is no overlap.

In other words, every time that the Viterbi algorithm is called, the Viterbi algorithm receives as an input, for example, 100 sound class scores and outputs 100 sound class decisions.

The settings are flexible, i.e., the number of frames could be set to a longer horizon and/or the frames could overlap.

Transition matrices can be used to forbid the transition between certain classes, for example, a dog bark decision can be forbidden to appear amongst a majority of baby cry decisions.

c) DNN Across a Long-Term Window

Examples of a DNN used to perform the long-term acoustic analysis performed are:

A long short-term memory recurrent neural network (LSTM-RNN) with 101 stacked frame score vectors (50 frames before and after a target frame), where score frame vectors contain 6 scores (one for each of 6 classes) as input. Thus, the input size is a 101 by 6 tensor. The rest of the DNN comprises 1 LSTM hidden layer with 50 units, hard sigmoid recurrent activation, and tanh activation. The output layer has 6 units for a 6-class system.

A gated recurrent units RNN (GRU-RNN): the input size is similarly a 101 by 6 tensor, after which there are 2 GRU hidden layers with 50 units each, and tanh activation. Before the output layer a temporal max pooling with a pool size of 2 if performed. The output layer has 6 units for a 6-class system.

Long-term information can be inflected by external duration or co-occurrence models, for example transition matrices in case c) of using a Viterbi optimal path search, or inflected by an external model made by learning the typical event and/or scene lengths, for example probabilities of event and/or scene duration captured by some machine learning method, typically DNNs.

The sound and/scene recognition at the sound recognition stage 414 further comprises processing the sound class decisions for a sequence of frames to recognise a non-verbal sound event and/or scene. In an example, the sound class decisions for multiple frames are input and an indication of one or more non-verbal sound events and/or scenes are output (see the non-verbal sound events and/or scenes identifiers 416 and a time 416b associated with each identifier). Examples of how this may be performed are explained below, one or more of the below examples may be implemented:

a) the sound class decisions for each frame may be grouped into long-term event and/or scene symbols with a start time, an end time and a duration;

b) discarding a sequence of sound class decisions of the same class which are shorter than a sound event and/or scene duration threshold defined individually for each sound class. For example: a sequence of "baby cry" sound class decisions can be discarded if the sequence of "baby cry" sound class decisions are collectively shorter than 116 milliseconds (which is approximately equivalent to 10 frames); a sequence of "smoke alarm" sound class decisions can be discarded if the sequence of "smoke alarm" sound class decisions are collectively shorter than 0.4 seconds (which is approximately equivalent to 25 frames). The sound event and/or scene duration thresholds can be set manually for each class;

c) merging multiple non-verbal sound events and/or scenes of the same sound class that intersect a particular time window into one single non-verbal sound event and/or scene. For example, if two "baby cry" non-verbal sound events and/or scenes are determined to happen within a 4 seconds interval then they are merged into one a single "baby cry" non-verbal sound events and/or scenes, where the window duration (4 seconds in the above example) is a parameter which can be manually tuned. The window duration can be different for each sound class.

The output of the sound recognition stage 414 is the sound recognition message 416. In the example illustrated in FIG. 4 the sound recognition message 416 comprises a sound recognition identifier 416a indicating a target sound or scene that has been recognised based on audio data captured in the environment. The sound identifier 416a indicates 'wind noise' has been recognised based on captured audio data captured in the environment. The sound recognition message comprises time information associated with the sound recognition identifier. The sound recognition message illustrated in FIG. 4 further comprises time information 416b 't=0.216 s' and a duration 416c '0.05 s'. The sound recognition message illustrated in FIG. 4 further comprises captured audio data 416d.

Camera Control Commands

The output of the sound recognition stage 414, i.e. the sound recognition message 416, is then output to the camera control computing device 114.

At transmission 448, the camera control computing device 114 receives, from the image capture system 108, an image 452 captured in the 102 environment and image metadata 454 associated with the image 452. The image metadata comprises an image capture time 456.

At optional transmission 450, the image capture system 108 sends clock synchronisation information to the sound recognition module 104, so that the date and time measurements made by the sound recognition device 104 and image capture system 108 are synchronised to a time reference. If the time synchronisation transmission 450 is not present, the user may manually synchronise the time on sound recognition device 104 and image capture system 108, and the camera control computing device 114 is designed to accommodate variations in synchronisation.

The camera control computing device 114 may be configured to determine an overlap between the image metadata 454 and the data in the sound recognition message 416 (e.g. a time 416b associated with each identifier) and insert the data from the sound recognition message 416 into the image metadata 454 if the image and sound times (and optionally dates) were overlapping. The inserted data may include the sound identifier 416a with start/end/duration time 416b (and optionally start/end/duration date) of the sound whose occurrence was overlapping with the time (and optionally date) where the picture was taken. It may also include the sound clip 416d which was captured and isolated by the microphone and recognised as a particular non-verbal sound. In other words, a further optional step involves the camera control computing device 114 adding data from the sound recognition message 416 to the metadata of an image. An example can be seen with reference to a second image of FIG. 4 ('picture 2') 460, where the captured sound 460a contained in the sound recognition message 416 is added to the metadata of the image 460. If there was no sound capture, a sound clip from a sound effects library with the same sound identity may be added to the metadata instead.

At stage 462, the processor 206 of the camera control computing device 114 is configured to detect that the target sound or scene occurred at a time that the image 452 was captured based on the image metadata 454 (by processing the image capture time 456) and the time information in the sound recognition message 416.

In the illustrative example, the metadata 454 comprises location information 458 relating to the image 452. In some example embodiments, the sound recognition information 416 comprises location information, and the image metadata comprises an image location. In such an embodiment, the processor 206 of the camera control computing device 114 is further configured to determine that the sound location and the image location are both in the environment 102. In this embodiment, the output of the camera control command to the image capture system 108 is further based on this determination.

The camera control computing device 114 may receive a second image 460 in addition to the first image 452. The second image 460 is processed as described above in relation to the first image 452.

As discussed above, the processor 206 of the camera control computing device 114 detects that the target sound or scene occurred at a time that the image 452 was captured based on the image metadata 454 and the time information provided in the sound recognition message 416. Based on this detection, the processor 206 of the camera control computing device 114 is configured to output a camera control command (e.g. 466, 468, 470) to the image capture system 108 (for example, one or more of the camera control commands 466, 468, 470 may be output to an image processing module 480, a user interface control module 481, and an audio processing module 482 respectively).

The processor 206 may be able to access a pre-defined list of possible camera control commands. The processor 206 is configured to select one or more camera control commands from the list by processing information from one or more of: the sound recognition message 416; the image metadata 454; and the image 452.

The processor may select one or more commands from the list of camera control commands in accordance with a set of a predefined rules expressed programmatically. Another example of how the processor may select one or more commands from the list of camera control commands is by utilising a decision tree describing a set of rules, either built manually or learned from data. A further example of how the processor may select one or more commands from the list of camera control commands is by inputting features (for example derived from one or more of: the sound recognition message 416; the image metadata 454; and the image 452) into a deep neural network trained to associate the input information with a camera control command. For example, the processor may input information from one or more of: the sound recognition message 416; the image metadata 454; and the image 452, as features into a machine learning model. The output classes of the machine learning model will be a number of pre-defined camera control commands. The machine learning model classifies the features into the camera control command classes. An operation is then performed to select one or more camera control commands based on the output of the machine learning model (i.e. based on the weighing of the camera control command classes). For example, the camera control command class having the highest score/weighting may be output.

A further example embodiment of generating a camera control command is where sound, image and time information are associated with one or more commands using predefined rules and the processor 206 is configured to select one or more camera control commands by processing, using the predefined rules, information from one or more of: the sound recognition message 416; the image metadata 454; and the image 452.

Multiple example camera control commands 466, 468, 470 are shown in FIG. 4. In embodiments, a camera control command 466, 468, 470 causes the image capture system 108 to generate and/or output a description of one or more of: the image 452; and one or more sounds or scenes identified in the sound recognition message. In embodiments, a camera control commands 466, 468, 470 causes the image capture system 108 to generate and/or output an alert based on one or more of: the image 454; and one or more sounds or scenes identified in the sound recognition message. In embodiments, a camera control commands 466, 468, 470 causes the image capture system 108 to generate and/or output such a description and/or such an alert. In embodiments, a camera control command is output to the image capture system, and the camera control command instructs the image capture system to capture one or more further images.

Camera Control Commands for an Image Processing Module

An example camera control command is the command 466. The camera control command 466 is output to an image processing module 480 of the image capture system 108. The camera control command 466 instructs the image processing module 480 to process the image 452 based on the sound recognition identifier 416. In one example the camera control command 466 instructs the image processing module 480 to store the image 452 in a memory 474 ('camera storage') of the image capture system 108. In a further example the camera control command 466 instructs the image processing module 480 to delete the image 452 from the memory 474 of the image capture system 108. In a further example the camera control command 466 instructs the image processing module 480 to perform an editing operation on the image 452 to generate an edited image and storing the edited image in the memory 474 of the image capture system 108. Generally speaking, image enhancement may be performed in response to the camera control command 466, for example to confirm an application of "Outdoors image filter" if the detected sounds were indicators of an outdoors scene (e.g. wind, cars passing by etc.).

If multiple images (e.g. image 452 and image 460) have been processed by the camera control computing device 114, an example camera control command 466 comprises an instruction to instruct the image processing module 480 of the image capture system 108 to: select a preferred image from the image 452 and the at least one additional image (e.g. the second image 460) based on the sound recognition identifier 416 and a further sound recognition identifier. The camera control command 466 comprises an instruction to store the preferred image in a memory 474 of the image capture system 108. In other words, the camera control computing device 114 is configured to select the best picture, or discard the worst pictures, from a series of pictures taken in a burst as a result of certain sounds happening synchronously, for example, the computing device may be configured to select the picture that corresponds to when a child started laughing, or remove the pictures happening when wind noise was happening. Thus embodiments provide for images or videos to be post-processed in various ways as a response to sound co-occurrence. For example, if there was no laughing sound detected at the time of the image then discard the image capture system may be configured to discard the image.

A camera control command may be configured to instruct the image capture system 108 to store a video from a point in the video at which a certain sound began, for example from when an alarm started to sound. Similarly, a camera control command may be configured to instruct the image capture system 108 to store only the images which were occurring at the same time as a sound and/or scene, for example to keep the image occurring when non-verbal sound "boo" just started. In general, a camera control command may be configured to instruct the image capture system 108 to select a particular image in a series of pictures taken as a burst or as a video.

Camera Control Commands for a User Interface Control Module

A further example of a camera control command is the camera control command 468. The camera control command 468 is output to a user interface control module 481 of the image capture system 108 and the camera control command 468 instructs the user interface control module 481 to control a user interface (e.g. camera display 476) of the image capture system 108 based on the sound recognition identifier. The camera control command 468 may instruct the user interface control module 481 to control the user interface to perform one or more of the following: display a description of the image on a display screen of the user interface; display an alert on the display screen of the user interface; output a description of the image from a speaker of the user interface; and output an alert from the speaker of the user interface. As an example, in response to receiving the camera control command 468, the image capture system 108 may indicate on a camera display 476 of the image capture system that a particular sound was happening while taking the picture or video (e.g "warning, wind noise").

The camera control command 468 may instruct the user interface control module 481 to output, from the speaker of the user interface, a description of a sound occurring at the time that the image was captured. In other words, the camera control command 468 may instruct the user interface control module 481 to output a description of the sound occurring while the image was taken, for example to output "wind is blowing" or "waves in the background".

The camera control command 468 may instruct the user interface control module 481 to output, from the speaker of the user interface, a combined description of the sound and the image. In other words, the camera control command 468 may instruct the user interface control module 481 to output a combined description of the sound and the image co-occurring, for example "windy field" or "noisy café".

Camera Control Commands for an Audio Processing Module

A further example of a camera control command is the camera control command 470. The camera control command 470 is output to an audio processing module 482 of the image capture system 108. The camera control command 470 instructs the audio processing module 482 of the image capture system to perform one or more of: filter the captured audio data 416*d*; and process the captured audio data 416*d* to remove noise, this is represented by the audio correction stage 478. As further example, the metadata of the image 460 displays how the metadata may be augmented by adding the audio 460*a* corresponding to salient sound events to their metadata, for example a captured sound of children laughing can be added to the metadata of an image comprising children. An example camera control command 466 may instruct the image capture system 108 to apply audio correction to the captured sound (e.g. 416d or 460a) as a result of co-occurrence with the image, for example to remove wind noise from a video or apply laugh enhancement filter to "child laughing" audio to make it more pleasant to listen to. In other words, an example camera control command 470 may instruct the image capture system 108 to remove certain sounds from the attached sound clip 416d, for example to remove the wind noise from a video soundtrack.

What may be referred to as a "Live image" can be created by adding a relevant snippet of audio context to images, for example adding, "just the laugh" to children pictures, or captured and isolated water sounds to boat pictures, to improve the experience of watching pictures to provide a better evocation power of the image.

Generally, any of the functions described herein can be implemented using software, firmware, hardware (e.g., fixed logic circuitry), or a combination of these implementations. The terms "module," "functionality", and "stage" as used herein generally represent software, firmware, hardware, or a combination thereof. In the case of a software implementation, the module, functionality, or stage represents program code that performs specified tasks when executed on a processor (e.g. CPU, CPUs or GPUs). The program code can be stored in one or more computer readable memory devices. The features of the techniques described below are platform-independent, meaning that the techniques may be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computing device comprising a processor, the processor configured to:
   receive, from an image capture system, an image captured in an environment and image metadata associated with said image, the image metadata comprising an image capture time;
   receive a sound recognition message from a sound recognition module, said sound recognition message comprising (i) a sound recognition identifier indicating a target sound or scene that has been recognized based on captured audio data captured in said environment, and (ii) time information associated with said sound recognition identifier;
   detect that the target sound or scene occurred at a time that said image was captured based on the image metadata and the time information in the sound recognition message; and
   output a camera control command to said image capture system based on said detection.

2. The computing device of claim 1, wherein said sound recognition message additionally comprises sound recognition information comprising at least one of: said captured audio data; an instruction to obtain said captured audio data; and pre-stored audio data associated with said sound recognition identifier.

3. The computing device of claim 2, wherein said processor is further configured to add said sound recognition information to the image metadata.

4. The computing device of claim 2, wherein said sound recognition information comprises a sound location, and said image metadata comprises an image location; and the processor is further configured to determine that the sound location and the image location are in said environment, wherein the output of the camera control command to said image capture system is further based on said determination.

5. The computing device of claim 2, wherein the camera control command is output to an audio processing module of the image capture system and the camera control command instructs the audio processing module to process said sound recognition information based on said sound recognition identifier.

6. The computing device of claim 1, wherein:
   said image metadata comprises an image capture date and said sound recognition message comprises date information associated with said sound recognition identifier; and
   the processor is further configured to detect that the target sound or scene occurred at a date that said image was captured based on the image metadata and the date information in the sound recognition message, wherein the output of the camera control command is further based on said detection.

7. The computing device of claim 1, wherein the camera control command is output to an image processing module of the image capture system and said camera control command instructs the image processing module to process said image based on said sound recognition identifier.

8. The computing device of claim 7, wherein the camera control command instructs the image processing module of the image capture system to process said image by:
   instructing the image processing module to store the image in a memory of the image capture system; or
   instructing the image processing module to delete the image from the memory of the image capture system; or
   instructing the image processing module to perform an editing operation on the image to generate an edited image and storing the edited image in the memory of the image capture system.

9. The computing device of claim 7, wherein the processor is configured to:
   receive, from the image capture system, at least one further image and associated further image metadata comprising (i) a further sound recognition identifier; and
   the camera control command comprises an instruction to instruct the image processing module of the image capture system to:
   select a preferred image from the image and the at least one additional image based on the sound recognition identifier and the further sound recognition identifier; and
   store said preferred image.

10. The computing device of claim 1, wherein the camera control command is output to a user interface control module of the image capture system and the camera control command instructs the user interface control module to control a user interface of the image capture system based on said sound recognition identifier.

11. The computing device of claim 10, wherein the camera control command instructs the user interface control module to control the user interface to perform one or more of:
   display a description of the image on a display screen of the user interface;

display an alert on the display screen of the user interface;
output a description of the image from a speaker of the user interface; output, from the speaker of the user interface, a description of a sound occurring at the time that said image was captured;
output, from the speaker of the user interface, a combined description of the sound and the image; and
output an alert from the speaker of the user interface.

12. The computing device of claim 1 wherein the camera control command is output to the image capture system, and the camera control command instructs the image capture system to capture one or more further images.

13. The computing device of claim 1, wherein the image capture system comprises one or more of: the computing device; a user interface; a camera image capture device; a display screen; an audio correction module; a digital storage; an encoding module, and an image processing module.

14. The computing device of claim 1, wherein the computing device is one of: a smart phone; a wearable device; a camera; a video camera; a smart speaker comprising a camera;
a smart home device; a smart assistant; a digital photo frame.

15. The computing device of claim 1, wherein the target sound is a non-verbal sound.

16. A computer implemented method, the method comprising:
receiving, from an image capture system, an image captured in an environment and image metadata associated with said image, the image metadata comprising an image capture time;
receiving a sound recognition message from a sound recognition module, said sound recognition message comprising (i) a sound recognition identifier indicating a target sound or scene that has been recognized based on captured audio data captured in said environment, and (ii) time information associated with said sound recognition identifier;
detecting that the target sound or scene occurred at a time that said image was captured based on the image metadata and the time information in the sound recognition message; and
outputting a camera control command to said image capture system based on said detection.

17. A non-transitory data carrier carrying processor control code which when running on a processor of a device causes the device to perform the method of claim 16.

* * * * *